May 25, 1926.
C. W. KURTZ ET AL
1,586,091
METHOD OF AND APPARATUS FOR HANDLING GLASS
Filed May 1, 1922   6 Sheets-Sheet 1
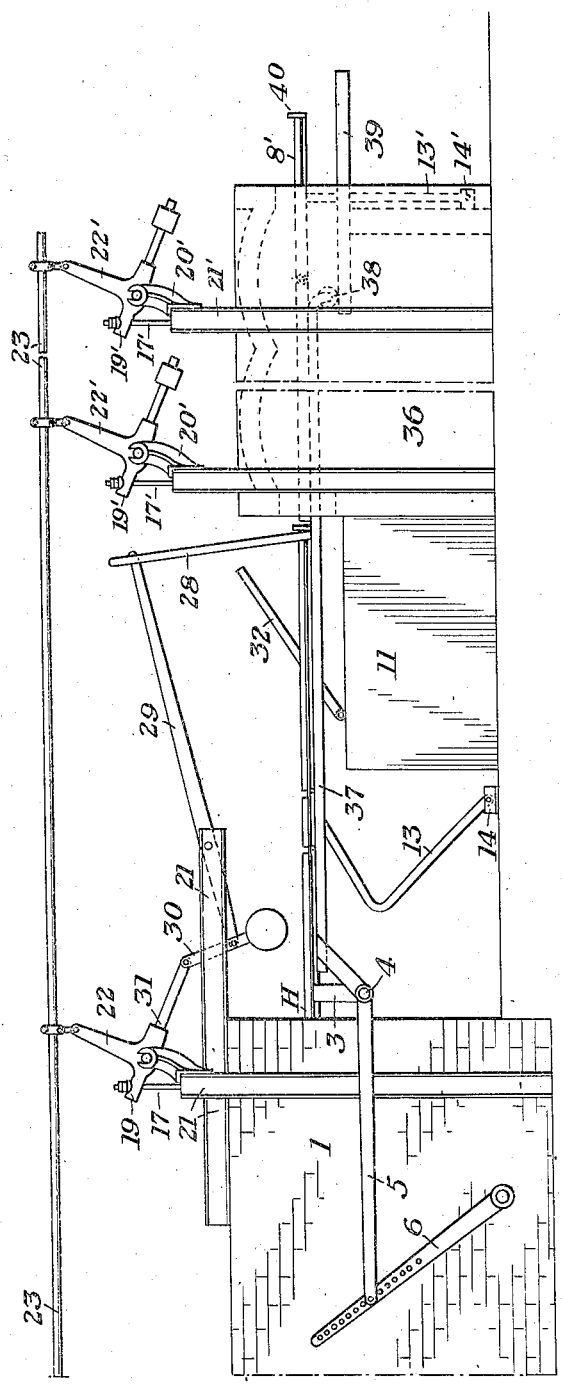
INVENTORS
Charles W. Kurtz,
Abrah M. Byers,
Louis R. Schmertz,
Lawrence A. Gessner
Byrnes, Stebbins, Burgess & Parmelee
their attys.

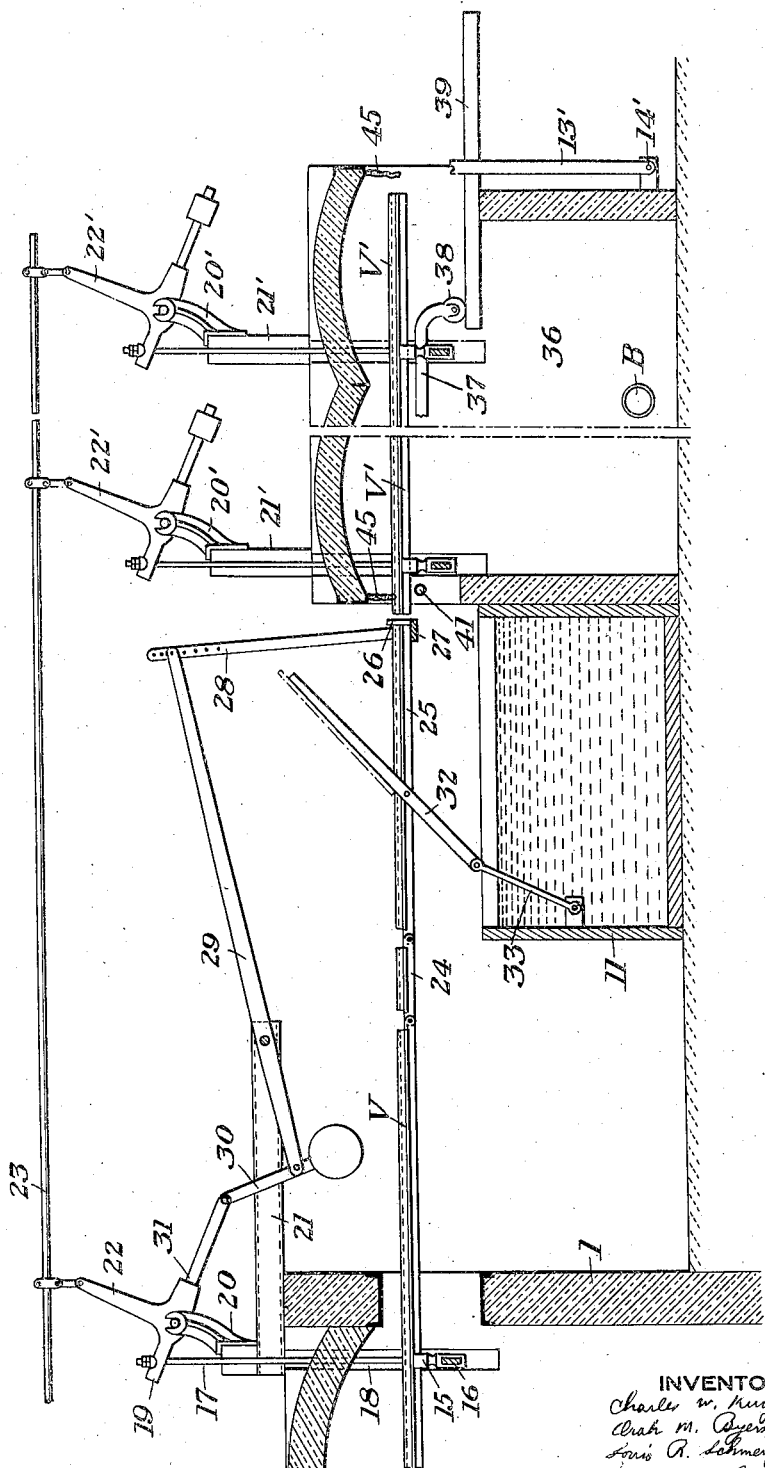

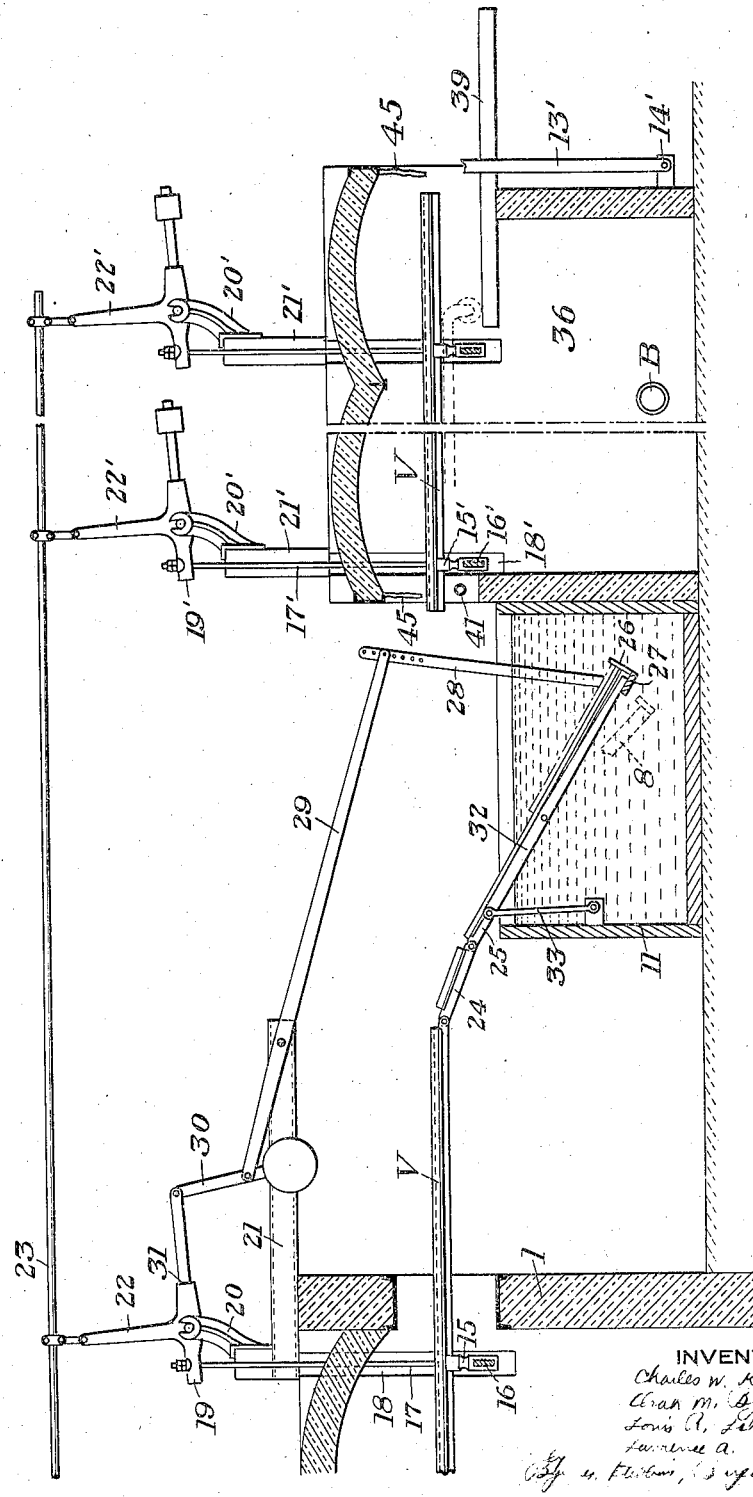

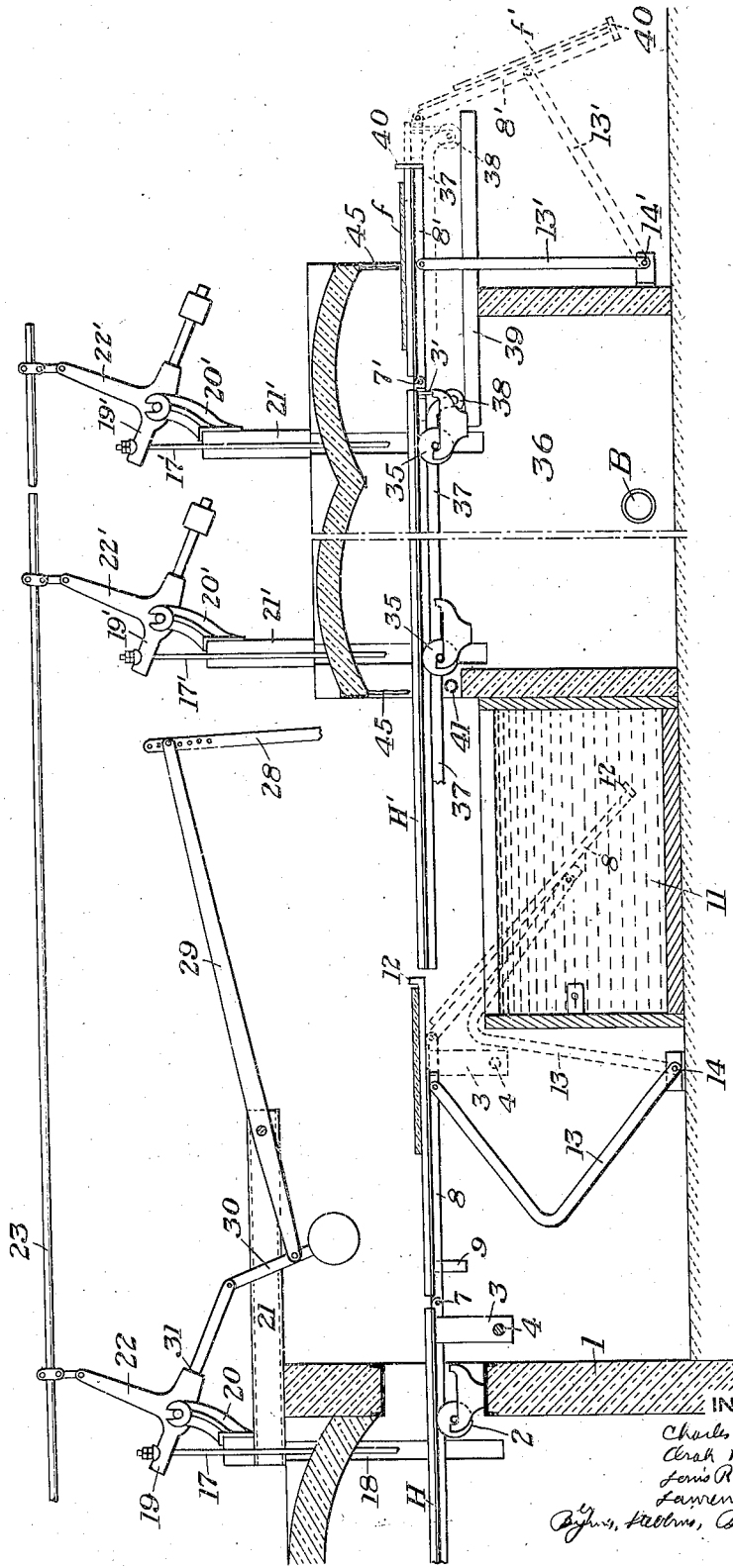

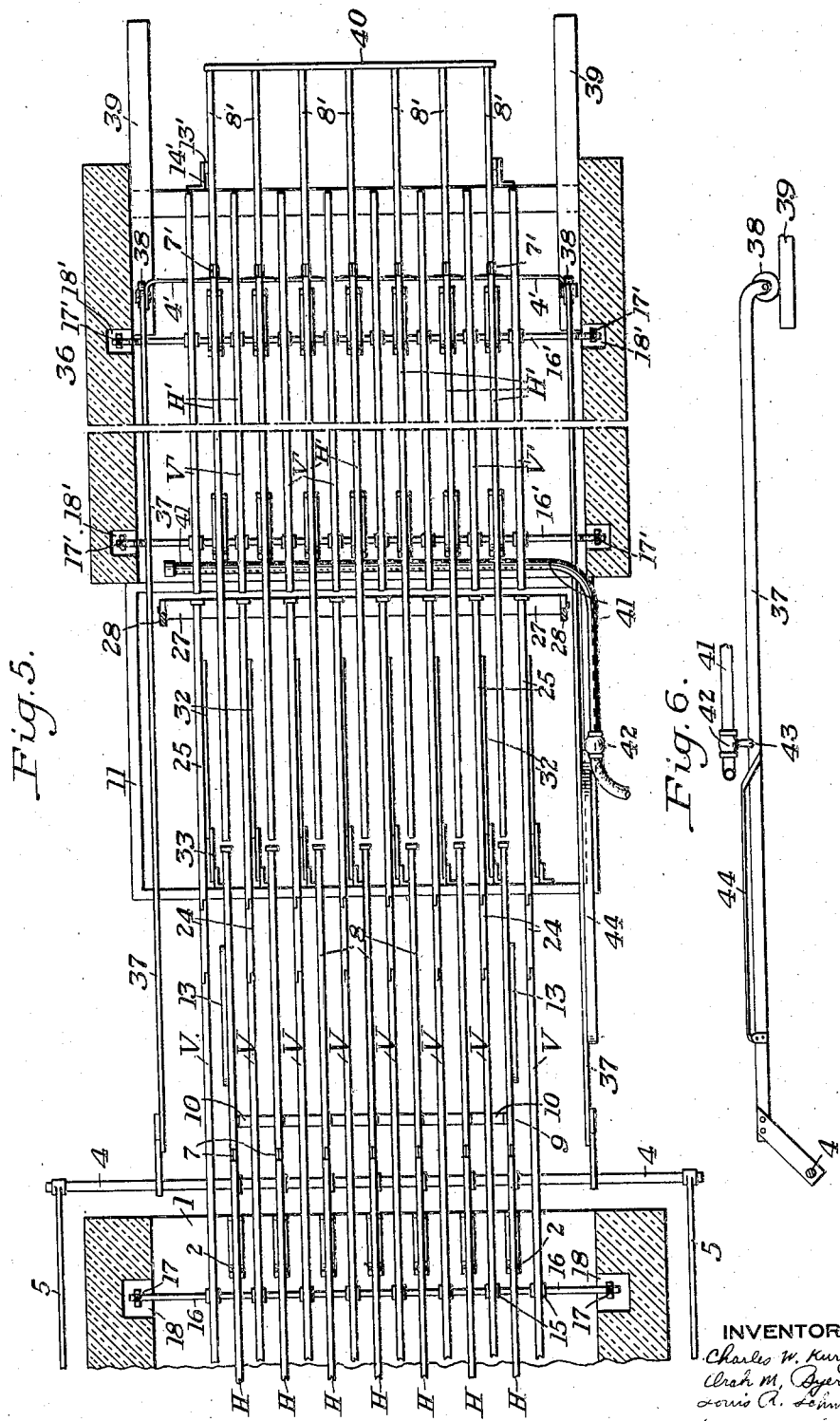

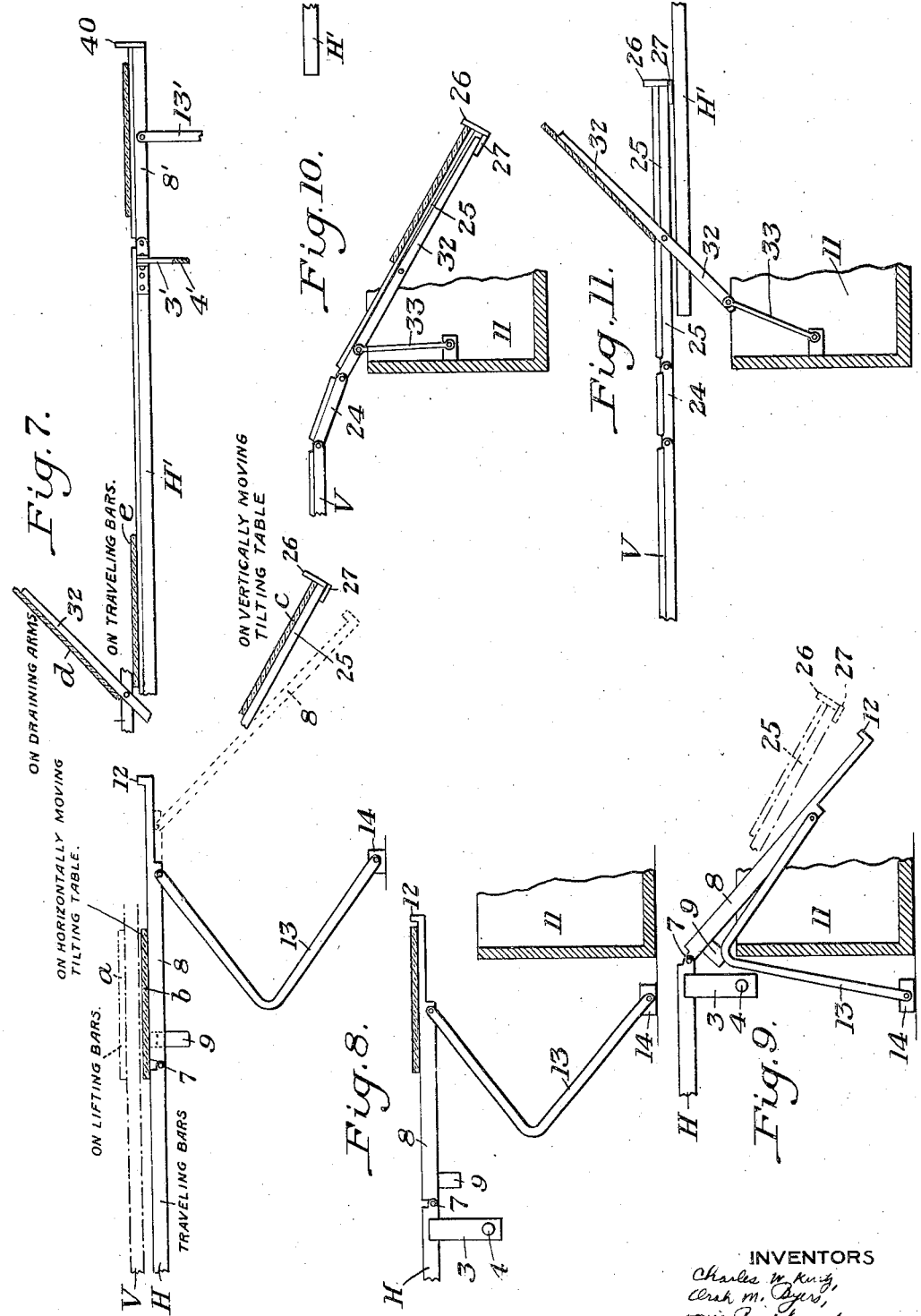

Patented May 25, 1926.

1,586,091

UNITED STATES PATENT OFFICE.

CHARLES W. KURTZ, OF PITTSBURGH, ORAH M. BYERS, OF KANE, LOUIS R. SCHMERTZ, OF LIGONIER, AND LAWRENCE A. GESSNER, OF JEANNETTE, PENNSYLVANIA, ASSIGNORS TO WINDOW GLASS MACHINE COMPANY, OF PITTSBURGH, PENNSYLVANIA, A CORPORATION OF NEW JERSEY.

METHOD OF AND APPARATUS FOR HANDLING GLASS.

Application filed May 1, 1922. Serial No. 557,657.

The present invention relates broadly to glass-handling and manipulating, and more particularly, to a method of and apparatus for automatically treating glass sheets with a liquid.

Heretofore, in the art to which this invention relates, it has been customary to feed glass sheets through an annealing oven or lehr. At the discharge end of such oven or lehr an operator manually picked up the annealed sheets and placed them on a rack, continuing the operation until the rack was filled. The rack was then lowered into an acid bath and permitted to remain for any desired period. After which it was raised and the sheets allowed to drain. The dipped sheets were then again manually handled and transferred to the cutting room. The manual handling and re-handling of the glass is not only heavy and dangerous work, but it requires a considerable amount of time and increases the possibility of breakage.

By the present invention, the glass sheets are automatically subjected to the treating liquid, dried, and then delivered ready for transfer to the cutting room. In the preferred form of the present invention, the annealed sheets are automatically transferred to a treating bath. These operations occur in timed relation to the operation of the lehr, whereby sheets may be continuously and successively treated as delivered by the lehr.

The nature of our invention, together with its objects and advantages, will be apparent as the invention becomes better understood by reference to the accompanying drawings, forming part of this specification, and illustrating a preferred embodiment of the invention, it being understood that changes may be made in the construction, arrangement and operation of the parts within the scope of our broader claims, without departing from the spirit of the invention.

In the drawings:

Figure 1 is a side elevation of an apparatus embodying the present invention and illustrating the relationship between the lehr and the dipping tank;

Figure 2 is a longitudinal sectional view through the apparatus illustrated in Figure 1, with the horizontally traveling bars and dipping table removed, the vertically moving lifting bars, the vertically movable tilting table, and the draining arms being in upper position;

Figure 3 is a view corresponding to Figure 2, illustrating the vertically moving lifting bars, the vertically moving tilting table and the draining arms in lower position;

Figure 4 is a view corresponding to Figure 2, with the vertically moving lifting bars, the vertically moving tilting table, and the draining arms removed, and the horizontally traveling bars and dipping table shown in full lines in the position shown in Figure 1;

Figure 5 is a top plan view of the apparatus illustrated in Figure 1, certain of the parts being shown in section;

Figure 6 is a longitudinal sectional view through a part of the apparatus, showing in side elevation an operating connection between sections of the horizontally traveling bars;

Figure 7 is a diagrammatic view illustrating successive positions occupied by a sheet of glass;

Figure 8 is a detail view of the dipping table, the table being shown in its upper forward position;

Figure 9 is a view of the table of Figure 8, but in its lower rearward position;

Figure 10 is a detail view of the vertically moving tilting table and draining arms, the table being shown in lower position; and Figure 11 is a view of the table and arms of Figure 10, but in their upper position.

Referring to the drawings, there is illustrated a portion of the discharge end of a lehr 1, having the usual supporting rollers 2, for the horizontally traveling glass-conveying bars H. These bars H at the discharge end of the lehr are provided with downwardly projecting brackets 3, secured to a transversely extending operating rod 4. Operatively connected to the ends of the rod 4 are links 5, adjustably connected to operating cranks 6, supported and operated in any desired manner, as is customary in this art, to horizontally reciprocate the bars H alternately and intermittently in opposite directions. Having a pivotal connection 7 with the end of each of the bars H is an extension 8. These extensions are provided with downwardly extending brackets 9, all connected to a common cross rod 10, whereby the extensions are compelled to move in unison about their pivotal connections 7. The extensions 8 in this manner co-operate to form a horizontally moving tilting dipping table for receiving sheets of glass and automatically bringing the same to a dipping tank 11 and dipping the same therein. The end of each of the extensions 8 may be provided with upwardly extending portions 12, for maintaining glass sheets in position thereon.

Adjacent each side of the dipping table 8, and between the lehr 1 and the tank 11, there is provided an angle lever 13. At their lower ends, the angle levers 13 are pivotally supported in suitable mountings 14, and at their upper ends they are pivotally connected to the two outside extensions 8 of the dipping table. Due to this construction, it will be apparent that when the horizontally traveling bars H are moved from the position illustrated in Figure 8 to the position illustrated in Figure 9, the dipping table 8 is lowered into the dipping tank 11 by the action of the angle levers 13. By the return movement of the horizontally traveling bars, the dipping table is brought from its inclined dipping or lower rearward position into its upper forward position, in which it lies substantially in the plane of the bars H and constitutes a continuation thereof.

Intermediate the bars H are vertically moving bars V. The bars V adjacent the discharge end of the lehr are each provided with a downwardly extending bracket 15, each of which brackets is suitably secured to an elevating rod 16. The ends of the elevating rod 16 are carried by adjustable tension links 17, working in pockets 18 in the sides of the lehr and extending through openings in the roof of the lehr. These links at their upper ends are pivotally supported on the arms 19 of inverted T-shaped levers pivotally carried by brackets 20 on the frame 21 of the lehr. The arms 22 of the T-shaped levers extend upwardly and are connected in any well known manner to longitudinally extending actuating members 23. The members 23 extend the entire length of the lehr and are connected at a plurality of intermediate points with tension links for lifting the vertically moving bars uniformly throughout their entire length.

Each of the vertically moving lifting bars V is pivotally connected at its rear end with a link 24, which links are, in turn, pivotally connected to extensions 25, which carry upwardly projecting fingers or stops 26, at their free ends. The free ends of the extensions 25 are all carried by a supporting rod 27, extending transversely of the extensions below the fingers 26. The ends of the rod 27 are carried by links 28, having an adjustable pivotal connection with the long ends of levers 29, pivotally supported by the frame 21 of the lehr. The short ends of the levers 29 are pivotally connected to counterweighted levers 30, pivotally secured to the arms 31 of the inverted T-shaped levers for the lifting bars.

The rod 27 causes all of the extensions 25 to move in unison, thereby causing them to form, in effect, a vertically moving tilting table which is raised and lowered with the vertically moving lifting bars V.

Pivotally carried by each of the extensions 25 is a draining arm 32, preferably of less width than the extensions 25, although this is not essential. One end of each of the draining arms is pivotally connected to a link 33, the lower ends of which links are pivotally carried by lugs formed on the tanks 11. The connections are so designed that when the vertically moving tilting table 25 is in its lower position, the arms 32 extend substantially parallel thereto, as shown in Figure 10, while when the table 25 is in its upper position, the arms 32 extend at an angle thereto, as clearly shown in Figure 11.

The operation of this portion of the apparatus is as follows:

Assuming sheets of glass in the lehr, with the vertically moving lifting bars in lower position and the horizontally traveling bars in forward position: the horizontally traveling bars will then be moved rearwardly toward the discharge end of the lehr. This will carry the sheets of glass a distance equal to the travel of the bars H. Thereafter, the bars V will be raised to lift the sheets of glass from the bars H, and the bars H will be moved forwardly. The bars V will then again be lowered to permit a new sheet of glass to be placed in the lehr, and the operation will be repeated, as is customary in this art. The operation will be continued until ultimately a sheet of glass is carried to the discharge end of the furnace on the bars H, from which it is lifted to the position *a* of Figure 7, by the bars V. The bars H then move forwardly into the full line position of Figure 7, and the sheet of glass is lowered thereonto by the bars V, into the position *b*. During the next rearward movement of the bars H, the sheet will slide downwardly on the table 8, as it enters the acid solution in the tank 11, until the extensions constituting the same pass between the extensions constituting the vertically moving tilting table 25, the table 25 having been lowered by the last downward movement of the bars V. At this time, the glass will be engaged by the extensions constituting the table 25 and be held in the position *c*, while the table 8 moves to the dotted line position of Figure 7. The vertically moving lifting bars V will then be raised, carrying with them the table 25. As the table 25 raises, the draining arms 32 will lift the sheet of glass therefrom and gradually move it to the position $d$ where it is permitted to drain. While it is so supported, the bars H will again move forwardly.

While the sheet of glass might be manually removed from the draining arms at this time, it is desirable to further heat and dry the dipped glass. The mechanism for effecting this operation automatically will now be described.

Separate from the bars H, but extending in alignment therewith, are horizontally traveling bars H', supported on rollers 35, corresponding to the rollers 2, and suitably supported in a supplemental heating or drying chamber 36. Each of the bars H' may be provided with a bracket 3' secured to a transversely extending rod 4'. The ends of the rod 4' are connected to the operating connections 37, Figure 6, connected at their forward ends with the rod 4 and supported at their rear ends on rollers 38, traveling on tracks 39, in the chamber 36. This construction constitutes, in effect, interrupted horizontally traveling bars with a horizontally moving tilting table interposed between the sections H and H' thereof, all of the parts being operated in unison.

Having a pivotal connection 7' with each of the bars H', is an extension 8', the extensions being connected at their free ends by a transversely extending rod 40, which also forms stops for the ends of the extensions. Pivotally connected to the two outside extensions 8' are levers 13' having pivotal mountings 14' for their lower ends. These levers 13' cause all of the extensions 8' to tilt in unison, during rearward movement of the bars H and H', from their full line position of Figure 4 to the dotted line position. It will be apparent, therefore, that these extensions constitute a second horizontally moving tilting table corresponding generally to the table 8.

Intermediate the bars H' are vertically moving bars V', corresponding in construction and operation to the bars V. The parts of the operating mechanism corresponding to the parts already described in detail in connection with the bars V, are designated by the same reference characters with a prime affixed thereto. It will be obvious that the bars V' will operate in unison with the bars V.

Within the chamber 36, below the bars H' and V', is a transversely extending perforated air pipe 41, having an air supply valve 42. The valve 42 is normally held in closed position by a weighted handle 43. This handle, however, lies in the path of travel of a cam 44, on one of the operating connections 37, whereby the valve will be opened each time the bars H and H' are reciprocated. By varying the length of the cam 44, the length of time during which the valve remains open may be varied. The perforations are preferably so disposed as to direct blasts of air upwardly and forwardly in opposition to the rearward movement of the bars H'.

With this construction, the forward movement of the bars H after a sheet of glass is held by the draining arms in the position $d$ of Figure 7, as before described, will bring the forward ends of the bars H' under the lower edge of the sheet so supported, and in operative position between said arms. Upon the next downward movement of the bars V, the draining arms will pass between the bars H' and deposit the sheet of glass thereon in the position $e$ of Figure 7. Thereafter, the next rearward movement of the bars H' will carry the sheet of glass into the chamber 36, which chamber is maintained at any desired temperature by burners B. As the sheet of glass enters the chamber, the valve 42 is opened by the cam 44, thereby directing a blast of air against the lower side of the sheet of glass in opposition to the direction of travel. This blast of air tends to blow the liquid from the sheet of glass. After the bars H' have concluded their rearward movement, the bars V' are moved to lift the glass sheet therefrom and enable the bars H' to again move forwardly. The glass during this time is subjected to the heat of the chamber 36, and any remaining liquid is evaporated therefrom. The dried sheet of glass is then lowered on to the horizontally moving tilting table 8' whereby the rearward movement of the bars H' will carry the sheet of glass out of the chamber 36, tilt the table 8' and deliver the annealed, dipped and dried sheet of glass in the dotted line position $f$ of Figure 4. While in this position, an operator may grasp the upper edge of the sheet in his gloved hands and place it on a truck for transfer to the cutting room.

If desired, the chamber 36 may be provided at each end thereof with flexible curtains 45, tending to keep the heat within the chamber and cooperating with the glass sheets to assist in the elimination of traces of liquid therefrom.

While only a single sheet of glass has been followed in its movement through the apparatus, it will be apparent that each rearward movement of the bars H will bring a new sheet of glass to the dipping tank, and each corresponding movement of the bars H' will deliver a sheet of glass to an operator for transfer to the cutting room. All of the various operations occur successively whereby piling up of the sheets is prevented and the output is maintained at a maximum.

The tilting delivery table 8' is made the subject matter of a copending application of Louis R. Schmertz and Lawrence H. Gessner, Serial No. 639,330, filed May 16, 1923.

The advantages of our invention will be apparent to those skilled in the art. In the preferred complete form shown, manual handling of the glass is done away with until after the dipping and drying operations. In this preferred form, the successive steps automatically follow each other, while the apparatus is comparatively simple. There is, of course, a considerable saving in labor, and less liability to breakage.

Parts of the method or sub-combinations thereof, may be used without using the entire process, and in the same way certain parts of the apparatus may be used without others. For example, the apparatus for transfer of the glass from the lehr to the bath may be manually operated or controlled. The sheets may be treated with liquid by spraying instead of by dipping; or they may be fed through a liquid-treating bath by rollers, conveyors or the like. The heating oven may be used or not, as desired, and many other changes may be made without departing from our invention as defined in the broader claims.

Where the glass is dipped in the liquid, we prefer to keep the liquid at a comparatively high temperature, as for example, by discharging steam into it.

We claim:

1. In a glass handling apparatus, an interrupted glass-carrying means, a lehr through which one section of said means passes, a heating chamber through which another section of said means passes, and means between the lehr and heating chamber for dipping the glass carried by said means.

2. In a glass handling apparatus, an interrupted glass-carrying means, a lehr through which one section of said means passes, a heating chamber through which another section of said means passes, and means between the lehr and heating chamber for automatically dipping the glass carried by said means, all of said means being operable in timed relation.

3. In a glass handling apparatus, an interrupted glass-carrying means, a lehr through which one section of said means passes, a heating chamber through which another section of said means passes, and means between the lehr and heating chamber for dipping the glass carried by said means, all of said means being operable in timed relation.

4. In a glass handling apparatus, an interrupted glass-carrying means, a lehr through which one section of said means passes, a heating chamber through which another section of said means passes, and means between the lehr and heating chamber for dipping and draining the glass carried by said means.

5. In a glass handling apparatus, an interrupted glass-carrying means, a lehr through which one section of said means passes, a heating chamber through which another section of said means passes, and means between the lehr and heating chamber for automatically dipping and draining the glass carried by said means.

6. In the method of treating sheet glass, the steps consisting in submerging a sheet of glass in a liquid treating bath, supporting the glass so as to substantially eliminate bending stresses therefrom, and moving the sheet while so supported out of one plane and into a non-parallel plane whereby an effective washing of the glass sheet is effected.

7. In the method of treating sheet glass, the steps consisting in submerging the glass in a liquid treating bath, supporting the glass sheet in such manner as to substantially eliminate bending stresses therefrom, and moving the glass in a relatively rapid manner from one plane into a non-parallel plane while so supported.

8. In the method of treating sheet glass, the steps consisting in submerging a sheet of glass in a liquid treating bath, so supporting the glass as to substantially eliminate bending stresses therefrom, and moving the sheet from one plane into a non-parallel plane, the movement being effective for withdrawing the sheet from the bath.

In testimony whereof, we have hereunto set our hands.

CHARLES W. KURTZ.
ORAH M. BYERS.
LOUIS R. SCHMERTZ.
LAWRENCE A. GESSNER.